(12) United States Patent
Afaq et al.

(10) Patent No.: US 11,645,702 B2
(45) Date of Patent: May 9, 2023

(54) TIME- AND GEOLOCATION-LIMITED MARKETPLACE

(71) Applicant: eBay Inc., San Jose, CA (US)

(72) Inventors: Muhammad Anzar Afaq, San Jose, CA (US); Emily Zhang, Mountain View, CA (US); Ran Chen, Belmont, CA (US); Frederik van Voorden, San Jose, CA (US)

(73) Assignee: EBAY INC., San Jose, CA (US)

( * ) Notice: Subject to any disclaimer, the term of this patent is extended or adjusted under 35 U.S.C. 154(b) by 79 days.

(21) Appl. No.: 17/243,077

(22) Filed: Apr. 28, 2021

(65) Prior Publication Data

US 2021/0319499 A1 Oct. 14, 2021

Related U.S. Application Data

(63) Continuation of application No. 16/386,618, filed on Apr. 17, 2019, now Pat. No. 11,017,456, which is a continuation of application No. 14/097,129, filed on Dec. 4, 2013, now Pat. No. 10,304,122.

(60) Provisional application No. 61/829,021, filed on May 30, 2013.

(51) Int. Cl.
*G06Q 30/00* (2012.01)
*G06Q 30/0601* (2023.01)

(52) U.S. Cl.
CPC ............... *G06Q 30/0639* (2013.01)

(58) Field of Classification Search
USPC ...................................... 705/26.1
See application file for complete search history.

(56) References Cited

U.S. PATENT DOCUMENTS

| 5,499,366 A | 3/1996 | Rosenberg et al. |
| 5,552,794 A | 9/1996 | Colley et al. |
| 5,873,069 A | 2/1999 | Reuhl et al. |
| 6,269,343 B1 | 7/2001 | Pallakoff |
| 6,868,393 B1 | 3/2005 | Demsky et al. |
| 7,395,257 B2 | 7/2008 | Gupta et al. |
| 7,848,765 B2 * | 12/2010 | Phillips ................. H04W 4/021 |
| | | 455/414.1 |
| 7,870,127 B2 | 1/2011 | Gupta et al. |

(Continued)

FOREIGN PATENT DOCUMENTS

| WO | 2000/043933 A1 | 7/2000 |
| WO | 2014/193534 A1 | 12/2014 |

OTHER PUBLICATIONS

Final Office Action received for U.S. Appl. No. 14/097,129, dated Jan. 27, 2017, 25 pages.

(Continued)

*Primary Examiner* — Mila Airapetian
(74) *Attorney, Agent, or Firm* — Schwegman Lundberg & Woessner, P.A.

(57) ABSTRACT

In some embodiments, an app provides a geolocation-limited marketplace limited to a pre-defined period of time. The geolocation-limited marketplace is accessible only by the users in a predefined geographical area. Typically, the predefined geographical area is limited to an area small enough for a user to walk from one end to the other in a short period of time. The pre-defined period of time is of some limited length of time that may occur at a pre-defined interval. In some instances, the period of time is one hour.

20 Claims, 17 Drawing Sheets

(56) References Cited

U.S. PATENT DOCUMENTS

| | | | |
|---|---|---|---|
| 8,266,032 | B1 | 9/2012 | Nathanson |
| 8,311,945 | B2 | 11/2012 | Hawkins et al. |
| 8,463,295 | B1* | 6/2013 | Caralis .................. G06Q 50/01 |
| | | | 705/14.54 |
| 8,923,889 | B2 | 12/2014 | Svendsen et al. |
| 8,996,035 | B2* | 3/2015 | Busch ................ G06Q 30/0256 |
| | | | 455/456.3 |
| 9,213,675 | B1* | 12/2015 | Kolton .................... H04W 4/21 |
| 9,576,254 | B2 | 2/2017 | Mcguire et al. |
| 10,304,122 | B2 | 5/2019 | Afaq et al. |
| 11,017,456 | B2 | 5/2021 | Afaq et al. |
| 2001/0051856 | A1 | 12/2001 | Niu et al. |
| 2001/0055025 | A1 | 12/2001 | Deering et al. |
| 2002/0023010 | A1 | 2/2002 | Rittmaster et al. |
| 2002/0087684 | A1 | 7/2002 | Foth |
| 2003/0014317 | A1 | 1/2003 | Siegel et al. |
| 2004/0002814 | A1 | 1/2004 | Gogic |
| 2005/0278117 | A1 | 12/2005 | Gupta et al. |
| 2006/0128397 | A1 | 6/2006 | Choti et al. |
| 2007/0233582 | A1 | 10/2007 | Abhyanker |
| 2008/0228399 | A1 | 9/2008 | Gupta et al. |
| 2009/0083151 | A1 | 3/2009 | Urban |
| 2009/0222891 | A1 | 9/2009 | Heffez |
| 2010/0076968 | A1 | 3/2010 | Boyns et al. |
| 2011/0167440 | A1 | 7/2011 | Greenfield |
| 2012/0005046 | A1 | 1/2012 | Wu et al. |
| 2012/0078751 | A1 | 3/2012 | Macphail et al. |
| 2012/0136998 | A1 | 5/2012 | Hough et al. |
| 2012/0173152 | A1 | 7/2012 | Butler et al. |
| 2012/0190387 | A1* | 7/2012 | Redstone ................ H04W 4/02 |
| | | | 455/456.3 |
| 2012/0196596 | A1 | 8/2012 | Perry, II |
| 2012/0284135 | A1 | 11/2012 | Hunter et al. |
| 2012/0284143 | A1 | 11/2012 | Hunter et al. |
| 2012/0303827 | A1 | 11/2012 | Neystadt et al. |
| 2013/0054422 | A1 | 2/2013 | Desouza et al. |
| 2013/0066699 | A1 | 3/2013 | Quinlan |
| 2013/0066821 | A1* | 3/2013 | Moore .................. H04L 67/306 |
| | | | 706/46 |
| 2013/0191902 | A1 | 7/2013 | Friedl et al. |
| 2013/0256403 | A1 | 10/2013 | Mackinnon |
| 2014/0032325 | A1 | 1/2014 | Weiss et al. |
| 2014/0100991 | A1* | 4/2014 | Lenahan ............ G06Q 10/0833 |
| | | | 705/26.7 |
| 2014/0358725 | A1 | 12/2014 | Afaq et al. |
| 2014/0379536 | A1 | 12/2014 | Varma et al. |
| 2019/0244279 | A1 | 8/2019 | Afaq et al. |

OTHER PUBLICATIONS

Final Office Action received for U.S. Appl. No. 14/097,129, dated Mar. 24, 2016, 23 pages.

Final Office Action received for U.S. Appl. No. 14/097,129, dated Sep. 10, 2018, 36 pages.

Non-Final Office Action received for U.S. Appl. No. 14/097,129, dated Aug. 12, 2015, 22 pages.

Non-Final Office Action received for U.S. Appl. No. 14/097,129, dated Jun. 29, 2016, 23 pages.

Non-Final Office Action received for U.S. Appl. No. 14/097,129, dated Sep. 11, 2017, 21 pages.

Notice of Allowance Received for U.S. Appl. No. 14/097,129 dated Jan. 10, 2019, 14 pages.

Supplemental Notice of Allowability received for U.S. Appl. No. 14/097,129, dated Apr. 17, 2019, 5 pages.

Non Final Office Action Received for U.S. Appl. No. 16/386,618, dated Jul. 21, 2020, 10 Pages.

Notice of Allowance Received for U.S. Appl. No. 16/386,618 dated Jan. 22, 2021, 7 pages.

Bareth et al., "GeoXMart—A Marketplace for Geofence-Based Mobile Services", Published in IEEE 34th Annual Computer Software and . . . , 2010, 7 Pages.

Chamberlain,"Q5.1: What is the best way to calculate the distance between 2 points?", Retrieved from the URL: <http://www.usenet-replayer.com/faq/comp.infosystems.gis.html>, Feb. 2001, 12 pages.

Dana,"Coordinate System Overview", Retrieved from the URL:<http://www.colorado.edu/geography/gcraft/notes/coordsys/coordsys.html>, Dec. 15, 1995, 10 pages.

International Preliminary Report on Patentability received for PCT Patent Application No. PCT/US2014/032419, dated Dec. 10, 2015, 7 pages.

International Search Report received for PCT Application No. PCT/US2014/032419, dated Aug. 28, 2014, 2 pages.

Written Opinion received for PCT Application No. PCT/US2014/032419, dated Aug. 28, 2014, 5 pages.

Wattenberg,"Spherical Coordinates", Retreived from the Internew URL: <http://www.math.montana.edu/frankw/ccp/multiworld/multipleIVP/spherical/body.htm#converting> Department of Mathematics, Montana State University, 1997, 10 pages.

U.S. Appl. No. 14/097,129 U.S. Pat. No. 10,304,122, filed Dec. 4, 2013, Time- and Geolocation-Limited Marketplace.

U.S. Appl. No. 16/386,618 U.S. Pat. No. 11,017,456, filed Apr. 17, 2019, Time- and Geolocation-Limited Marketplace.

* cited by examiner

Do you have this purse in red? —710

TIME- AND GEOLOCATION-LIMITED MARKETPLACE

RELATED APPLICATIONS

This application is a continuation of and claims the benefit of priority of U.S. application Ser. No. 16/386,618, filed Apr. 17, 2019, which is a continuation of and claims the benefit of priority of U.S. application Ser. No. 14/097,129, filed Dec. 4, 2013, which claims the benefit of priority of U.S. Provisional Application Ser. No. 61/829,021, filed on May 30, 2013, each of which is hereby incorporated by reference in its entirety.

TECHNICAL FIELD

The present application relates generally using location and time data to provide information for a publication system.

BACKGROUND

Users carry mobile devices (e.g., smartphones) as they pursue their daily activities. The mobile devices include and have access to a geolocation service (e.g., a global positioning service (GPS)). The geolocation service may be used to identify the geolocation of the mobile device and, assuming the mobile device is in the possession of the user, the user. The mobile device may have one or more applications (i.e., "apps") that use the present location determined by the geolocation service to present information to the user.

BRIEF DESCRIPTION OF THE DRAWINGS

Some embodiments are illustrated by way of example and not limitations in the figures of the accompanying drawings, in which.

DETAILED DESCRIPTION

Figure 1:
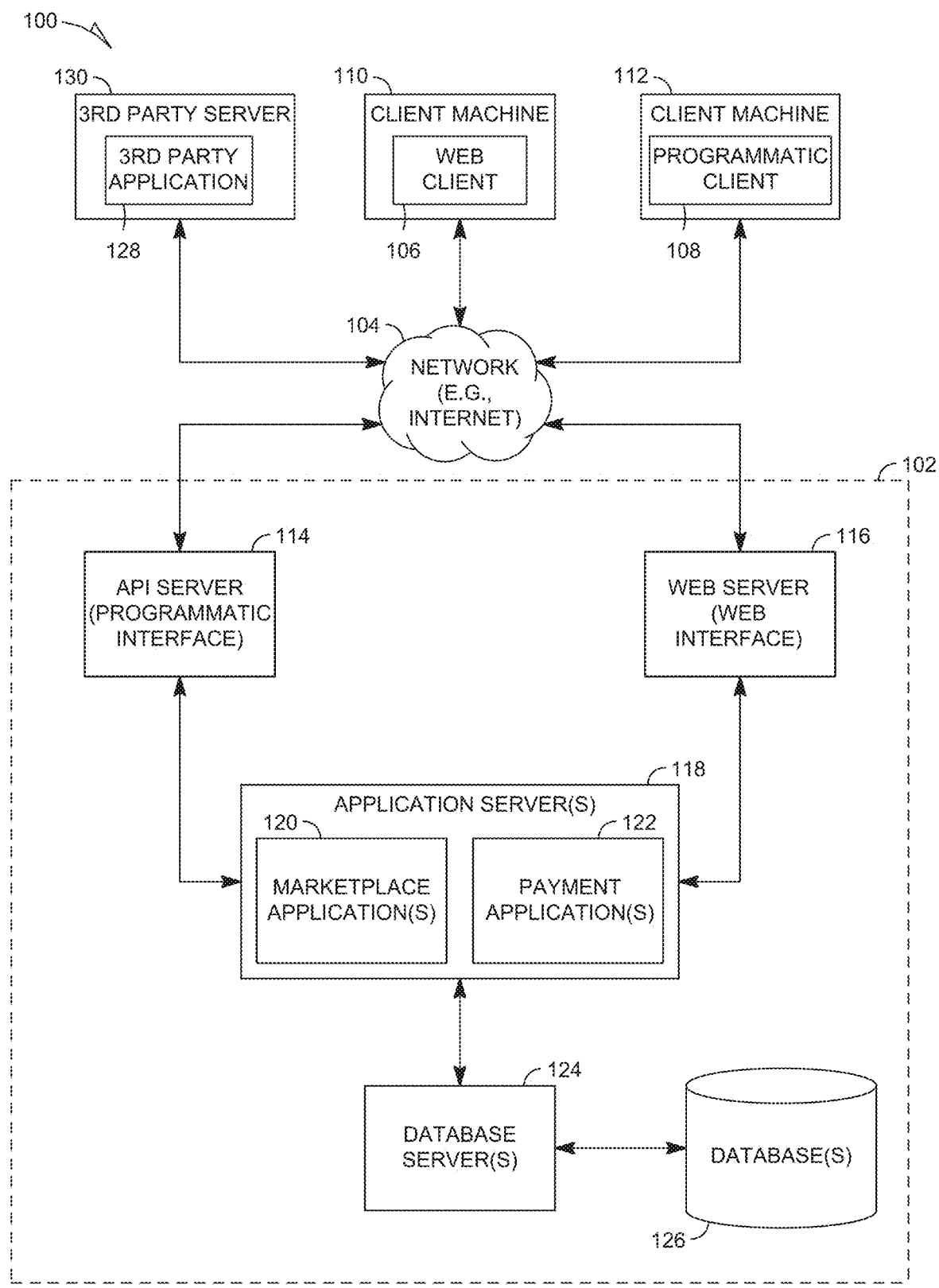
FIG. 1 illustrates a block diagram depicting a network architecture of a system, according to some embodiments, having a client-server architecture configured for exchanging data over a network.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright eBay, Inc. 2013, All Rights Reserved.

Example methods and systems to provide a time- and geolocation-limited marketplace are described. In the following description, for purposes of explanation, numerous specific details are set forth in order to provide a thorough understanding of example embodiments. It will be evident, however, to one skilled in the art that the present invention may be practiced without these specific details.

In online publication systems such as, in one embodiment, marketplaces, users buy and sell goods with one another. Some online marketplaces may have just one seller while others may have multiple sellers. The marketplaces may be accessed via the Internet or another communications network. Typically, the users publish a description of a good they would like to buy or sell. In some instances, the good may be a physical item while in others the good may be a service or experience. The good may be typically associated with a geographical location where it may be stored or from which it may be offered. For example, a good that is an experience may be offered by a restaurant at a particular geolocation.

In some embodiments, an app may provide a geolocation-limited marketplace limited to a pre-defined period of time. The geolocation-limited marketplace is accessible by users in a predefined geographical area. The predefined geographical area may be defined as being within a threshold distance of a specified location. The predefined geographical area may be shaped or defined in terms of landmarks, street names and intersections, school or work campuses, neighborhoods, event venues, etc. Distance calculation technology is well known and may be found, in one example, in U.S. Pat. No. 7,395,257 entitled "Automated Method and System to Calculate the Surface Distance Between Two Geographical Locations, and to Filter a Data Set Based on the Calculation," issued Jul. 1, 2008 and incorporated herein by reference in its entirety. Typically, the predefined geographical area may be limited to an area small enough for a user to walk from one end to the other in a short period of time (e.g., approximately 2 miles). The geographical area may, however, be larger or smaller depending on a number of factors including the purpose of the marketplace, the mobility of the target users, and other factors.

The pre-defined period of time may be defined by the online marketplace. The pre-defined period of time may be of some limited length of time that occurs at a pre-defined interval. The limited length of time may be defined according to a time of day, a time of another event, a threshold density of users being located in the geographical area, or some other criteria. The pre-defined period of time may be as short as a few minutes or extend over a number of hours. In some instances, the period of time is one hour. In another embodiment, the pre-defined time period may be defined by a user of the online marketplace.

FIG. 1 is a network diagram depicting a client-server system 100, within which one example embodiment may be deployed. A networked system 102, in the example forms of a network-based marketplace or publication system (sometimes referred to as "publisher"), provides server-side functionality, via a network 104 (e.g., the Internet or Wide Area Network (WAN)) to one or more clients. FIG. 1 illustrates, for example, a web client 106 (e.g., a browser), and a programmatic client 108 executing on respective client machines 110 and 112.

An Application Program Interface (API) server 114 and a web server 116 are coupled to, and provide programmatic and web interfaces respectively to, one or more application servers 118. The application servers 118 host one or more marketplace applications 120 and payment applications 122. The application servers 118 are, in turn, shown to be coupled to one or more databases servers 124 that facilitate access to one or more databases 126.

The marketplace applications 120 may provide a number of marketplace functions and services to users that access the networked system 102. The payment applications 122 may likewise provide a number of payment services and functions to users. The payment applications 122 may allow users to accumulate value (e.g., in a commercial currency, such as the U.S. dollar, or a proprietary currency, such as "points") in accounts, and then later to redeem the accumulated value for products (.e.g., goods or services) that are made available via the marketplace applications 120. While the marketplace and payment applications 120 and 122 are shown in FIG. 1 to both form part of the networked system 102, it will be appreciated that, in alternative embodiments, the payment applications 122 may form part of a payment service that may be separate and distinct from the networked system 102.

Further, while the system 100 shown in FIG. 1 employs client-server architecture, the present disclosure is of course not limited to such an architecture, and could equally well find application in a distributed, or peer-to-peer, architecture system, for example. The various marketplace and payment applications 120 and 122 could also be implemented as standalone software programs, which do not necessarily have networking capabilities.

The web client 106 accesses the various marketplace and payment applications 120 and 122 via the web interface supported by the web server 116. Similarly, the programmatic client 108 accesses the various services and functions provided by the marketplace and payment applications 120 and 122 via the programmatic interface provided by the API server 114. The programmatic client 108 may, for example, be a seller application (e.g., the TurboLister application developed by eBay Inc., of San Jose, Calif.) to enable sellers to author and manage listings on the networked system 102 in an off-line manner, and to perform batch-mode communications between the programmatic client 108 and the networked system 102.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more promotional, marketplace or payment functions that are supported by the relevant applications of the networked system 102.

Figure 2:
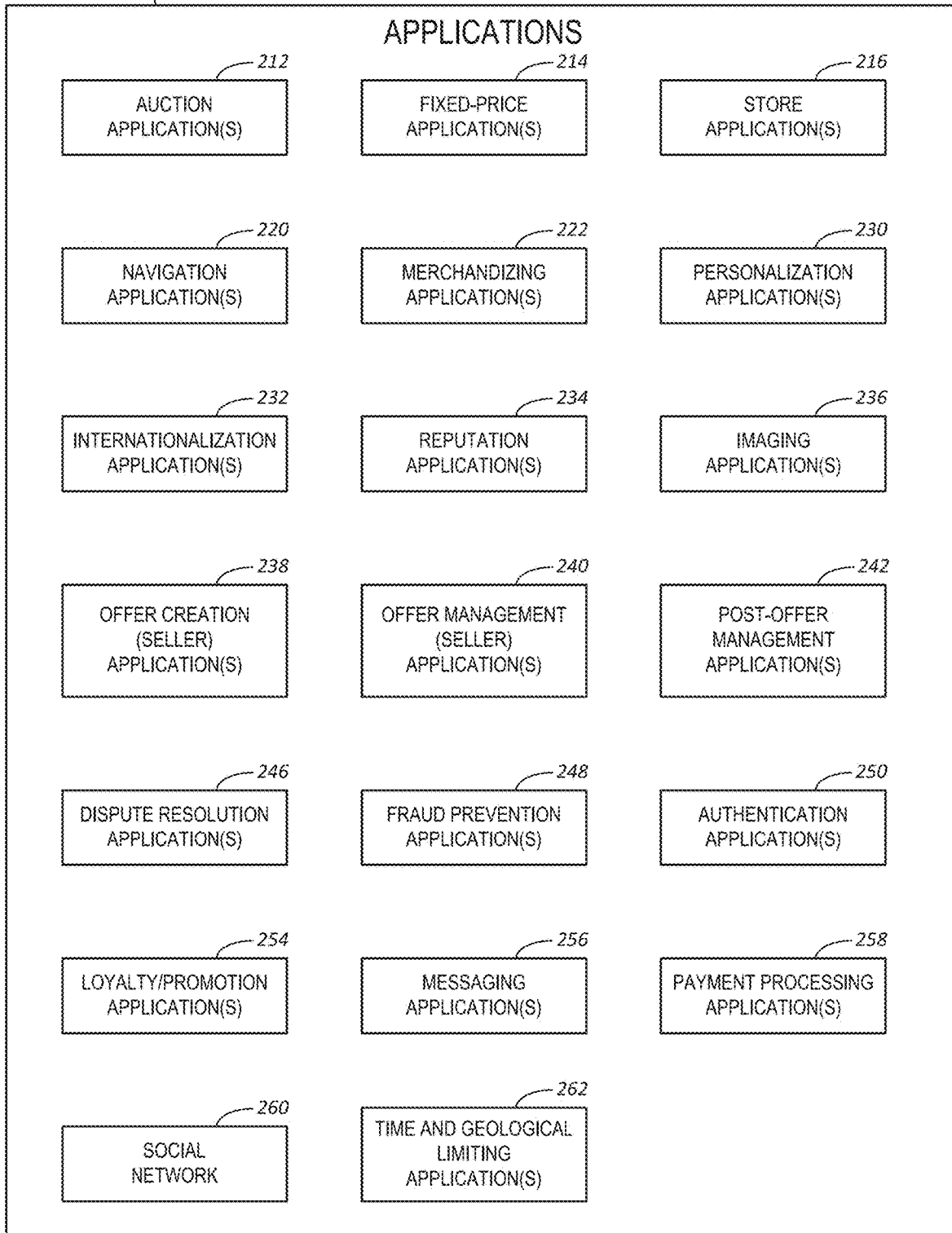
FIG. 2 illustrates a block diagram showing components provided within the system of FIG. 1 according to example embodiments.

FIG. 2 illustrates a block diagram showing applications of application server(s) that are part of the network system 101, in an example embodiment. In this embodiment, the publication system 120, and the payment system 120 may be hosted by the application server(s) 118 of the network system 101. The publication system 120 and the payment system 122 may be hosted on dedicated or shared server machines (not shown) that are communicatively coupled to enable communications between server machines. The applications themselves may be communicatively coupled (e.g., via appropriate interfaces) to each other and to various data sources, so as to allow information to be passed between the applications or so as to allow the applications to share and access common data.

The publication system 120 are shown to include at least one or more auction application(s) 212 which support auction-format listing and price setting mechanisms (e.g., English, Dutch, Vickrey, Chinese, Double, Reverse auctions etc.). The auction application(s) 212 may also provide a number of features in support of such auction-format listings, such as a reserve price feature whereby a seller may specify a reserve price in connection with a listing and a proxy-bidding feature whereby a bidder may invoice automated proxy bidding. The auction-format offer in any format may be published in any virtual or physical marketplace medium and may be considered the point of sale for the commerce transaction between a seller and a buyer (or two users).

One or more fixed-price application(s) 214 support fixed-price listing formats (e.g., the traditional classified advertisement-type listing or a catalogue listing) and buyout-type listings. Specifically, buyout-type listings (e.g., including the Buy-It-Now® (BIN) technology developed by eBay Inc., of San Jose, Calif.) may be offered in conjunction with auction-format listings, and allow a buyer to purchase goods or services, which are also being offered for sale via an auction, for a fixed-price that may be typically higher than the starting price of the auction.

The application(s) of the application server(s) 118 may include one or more store application(s) 216 that allow a seller to group listings within a "virtual" store. The virtual store may be branded and otherwise personalized by and for the seller. Such a virtual store may also offer promotions, incentives and features that are specific and personalized to a relevant seller.

Navigation of the online marketplace may be facilitated by one or more navigation application(s) 220. For example, a search application (as an example of a navigation application) may enable key word searches of listings published via the network-based publisher 102. A browse application may allow users to browse various category, catalogue, or inventory data structures according to which listings may be classified within the network-based publisher 102. Various other navigation applications may be provided to supplement the search and browsing applications.

Merchandizing application(s) 222 support various merchandising functions that are made available to sellers to enable sellers to increase sales via the network-based publisher 102. The merchandizing application(s) 222 also operate the various merchandising features that may be invoked by sellers, and may monitor and track the success of merchandising strategies employed by sellers.

Personalization application(s) 230 allow users of the network-based publisher 102 to personalize various aspects of their interactions with the network-based publisher 102. For example, a user may, utilizing an appropriate personalization application 230, create a personalized reference page at which information regarding transactions to which the user may be (or has been) a party may be viewed. Further, the personalization application(s) 230 may enable a third party to personalize products and other aspects of their interactions with the network-based publisher 102 and other parties, or to provide other information, such as relevant business information about themselves.

The publication system 120 may include one or more internationalization application(s) 232. In one embodiment, the network-based publisher 102 may support a number of marketplaces that are customized, for example, for specific geographic regions. A version of the network-based publisher 102 may be customized for the United Kingdom, whereas another version of the network-based publisher 102 may be customized for the United States. Each of these versions may operate as an independent marketplace, or may be customized (or internationalized) presentations of a common underlying marketplace. The network-based publisher 102 may accordingly include a number of internationalization application(s) 232 that customize information (and/or the presentation of information) by the network-based publisher 102 according to predetermined criteria (e.g., geographic, demographic or marketplace criteria). For example, the internationalization application(s) 232 may be used to support the customization of information for a number of regional websites that are operated by the network-based publisher 102 and that are accessible via respective web servers.

Reputation application(s) 234 allow users that transact, utilizing the network-based publisher 102, to establish, build and maintain reputations, which may be made available and published to potential trading partners. Consider that where, for example, the network-based publisher 102 supports person-to-person trading, users may otherwise have no history or other reference information whereby the trustworthiness and credibility of potential trading partners may be assessed. The reputation application(s) 234 allow a user, for example through feedback provided by other transaction partners, to establish a reputation within the network-based publisher 102 over time. Other potential trading partners may then reference such a reputation for the purposes of assessing credibility and trustworthiness.

In order to make listings, available via the network-based publisher 102, as visually informing and attractive as possible, the publication system 120 may include one or more imaging application(s) 236 utilizing which users may upload images for inclusion within listings. An imaging application 236 also operates to incorporate images within viewed listings. The imaging application(s) 236 may also support one or more promotional features, such as image galleries that are presented to potential buyers. For example, sellers may generally pay an additional fee to have an image included within a gallery of images for promoted items.

The publication system 120 may include one or more offer creation application(s) 238. The offer creation application(s) 238 allow sellers conveniently to author products pertaining to goods or services that they wish to transact via the network-based publisher 102. Offer management application(s) 240 allow sellers to manage offers, such as goods, services, or donation opportunities. Specifically, where a particular seller has authored and/or published a large number of products, the management of such products may present a challenge. The offer management application(s) 240 provide a number of features (e.g., auto-reproduce, inventory level monitors, etc.) to assist the seller in managing such products. One or more post-offer management application(s) 242 also assist sellers with a number of activities that typically occur post-offer. For example, upon completion of an auction facilitated by one or more auction application(s) 212, a seller may wish to leave feedback regarding a particular buyer. To this end, a post-offer management application 242 may provide an interface to one or more reputation application(s) 234, so as to allow the seller conveniently to provide feedback regarding multiple buyers to the reputation application(s) 234.

The dispute resolution application(s) 246 may provide mechanisms whereby disputes arising between transacting parties may be resolved. For example, the dispute resolution application(s) 246 may provide guided procedures whereby the parties are guided through a number of steps in an attempt to settle a dispute. In the event that the dispute cannot be settled via the guided procedures, the dispute may be escalated to a mediator or arbitrator.

The fraud prevention application(s) 248 may implement various fraud detection and prevention mechanisms to reduce the occurrence of fraud within the network-based publisher 102. The fraud prevention application(s) may prevent fraud with respect to the third party and/or the client user in relation to any part of the request, payment, information flows and/or request fulfilment. Fraud may occur with respect to unauthorized use of financial instruments, non-delivery of goods, and abuse of personal information.

Authentication application(s) 250 may verify the identity of a user, and may be used in conjunction with the fraud prevention application(s) 248. The user may be requested to submit verification of identity, an identifier upon making the purchase request, for example. Verification may be made by a code entered by the user, a cookie retrieved from the device, a phone number/identification pair, a username/password pair, handwriting, and/or biometric methods, such as voice data, face data, iris data, finger print data, and hand data. In some embodiments, the user may not be permitted to login without appropriate authentication. The system (e.g., the FSP) may automatically recognize the user, based upon the particular network-based device used and a retrieved cookie, for example.

The network-based publisher 102 itself, or one or more parties that transact via the network-based publisher 102, may operate loyalty programs and other types of promotions that are supported by one or more loyalty/promotions application(s) 254. For example, a buyer/client user may earn loyalty or promotions points for each transaction established and/or concluded with a particular seller/third party, and may be offered a reward for which accumulated loyalty points can be redeemed.

The application server(s) 118 may include messaging application(s) 256. The messaging application(s) 256 are responsible for the generation and delivery of messages to client users and third parties of the network-based publisher 102. Information in these messages may be pertinent to services offered by, and activities performed via, the payment system 120. Such messages, for example, advise client users regarding the status of products (e.g., providing "out of stock" or "outbid" notices to client users) or payment status (e.g., providing invoice for payment, Notification of a Payment Received, delivery status, invoice notices). Third parties may be notified of a product order, payment confirmation and/or shipment information. Respective messaging application(s) 256 may utilize any one of a number of message delivery networks and platforms to deliver messages to users. For example, messaging application(s) 256 may deliver electronic mail (e-mail), instant message (IM), Short Message Service (SMS), text, facsimile, or voice (e.g., Voice over IP (VoIP)) messages via the wired (e.g., the Internet), Plain Old Telephone Service (POTS), or wireless (e.g., mobile, cellular, WiFi, WiMAX) networks.

The payment system 120 may include one or more payment processing application(s) 258. The payment processing application(s) 258 may receive electronic invoices from the merchants and may receive payments associated with the electronic invoices. The payment system 120 may also make use of functions performed by some applications included in the publication system 120.

The publication system 120 may include one or more social network application(s) 260.

The publication system 120 may also include one or more time- and geolocation-limiting application(s) 262 which may be used for the time-and geolocation-limited system described in more detail below.

As stated briefly above, an app may provide a geolocation-limited marketplace which may also be limited to a pre-defined period of time. The geolocation-limited marketplace may be accessible by users in a predefined geographical area.

If the user is located within the geographical area during the predefined period of time, the user may open an app to access the marketplace to post items for sale and to purchase items posted for sale. In some instances, the user may open the app in response to receiving a prompt or notification.

Figure 3:
FIG. 3 illustrates listed items in a time and geolocation limited marketplace, according to an example embodiment.
Figure 4:
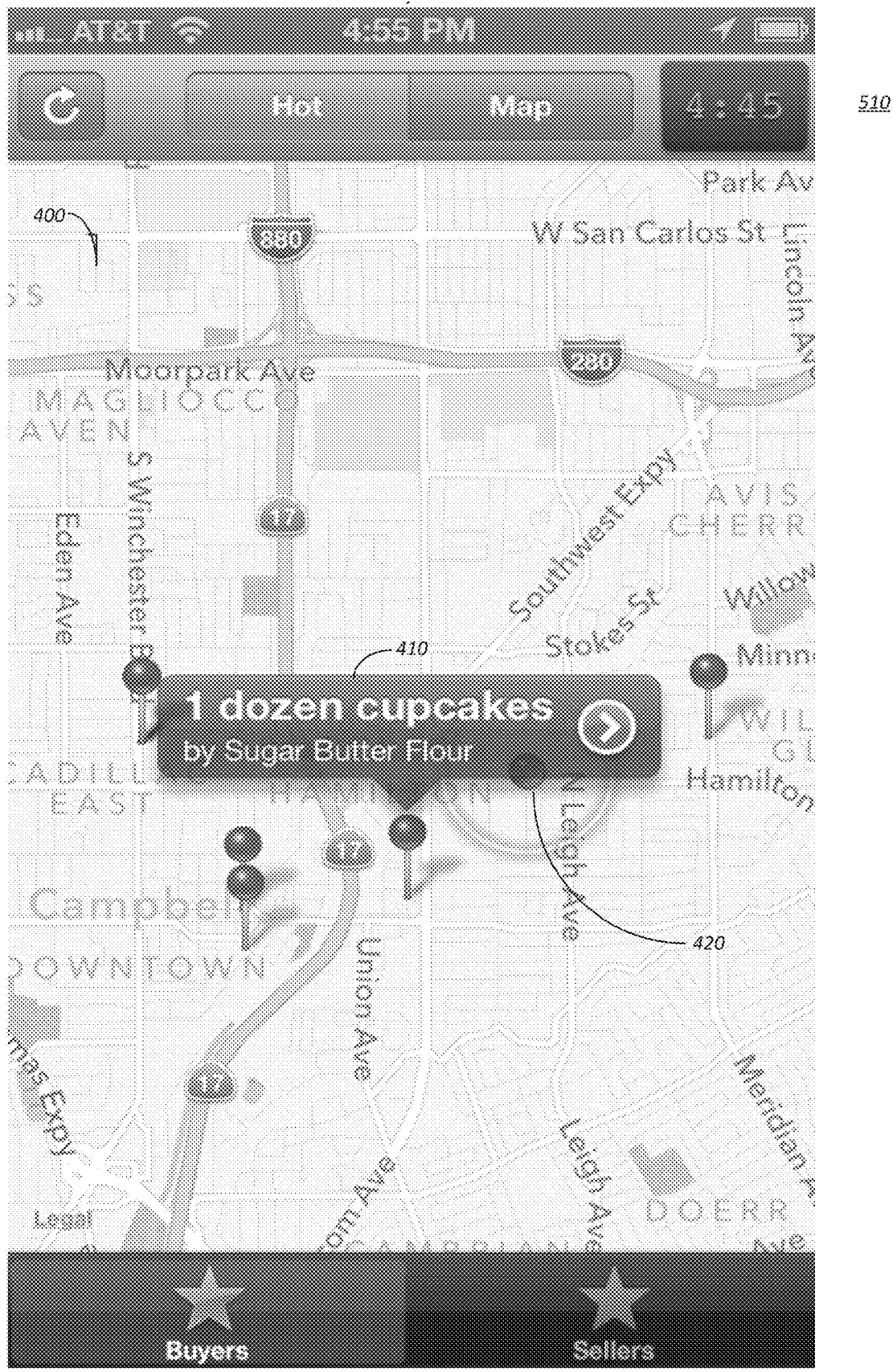
FIG. 4 is a screen shot illustrating items, in a time and geolocation limited marketplace, listed by geographical area, according to an example embodiment.

FIGS. 3 and 4 illustrate two ways to browse registered retailers that are geographically close to the user. The view of each of these two figures is keyed off the user's location. FIG. 3 incorporates an arbitrary algorithm to rank the sales based on a popularity metric which may be decided upon by the system designer. The location of each figure is represented by the blue pin seen at 420 of FIG. 4, which is displaying a location on Hamilton Avenue in the city of Campbell, Calif., east of Bascom Avenue. The screen capture may be taken from the user's smart phone. FIGS. 3 and 4 are therefore different ways to display data for sellers in the located in the Campbell, Calif., area. The different map pins in FIG. 4 match up with the different table cell entries from FIG. 3. As a buyer, the user may browse items posted (e.g., listed for sale) in the time- and geolocation-limited marketplace 300. The app may include a countdown timer 310, which may be in minutes and seconds, indicating how much longer the user can purchase the posted items such as selectable listings for a stroller 320 and boots 330 during that particular instance of the marketplace.

Figure 5:
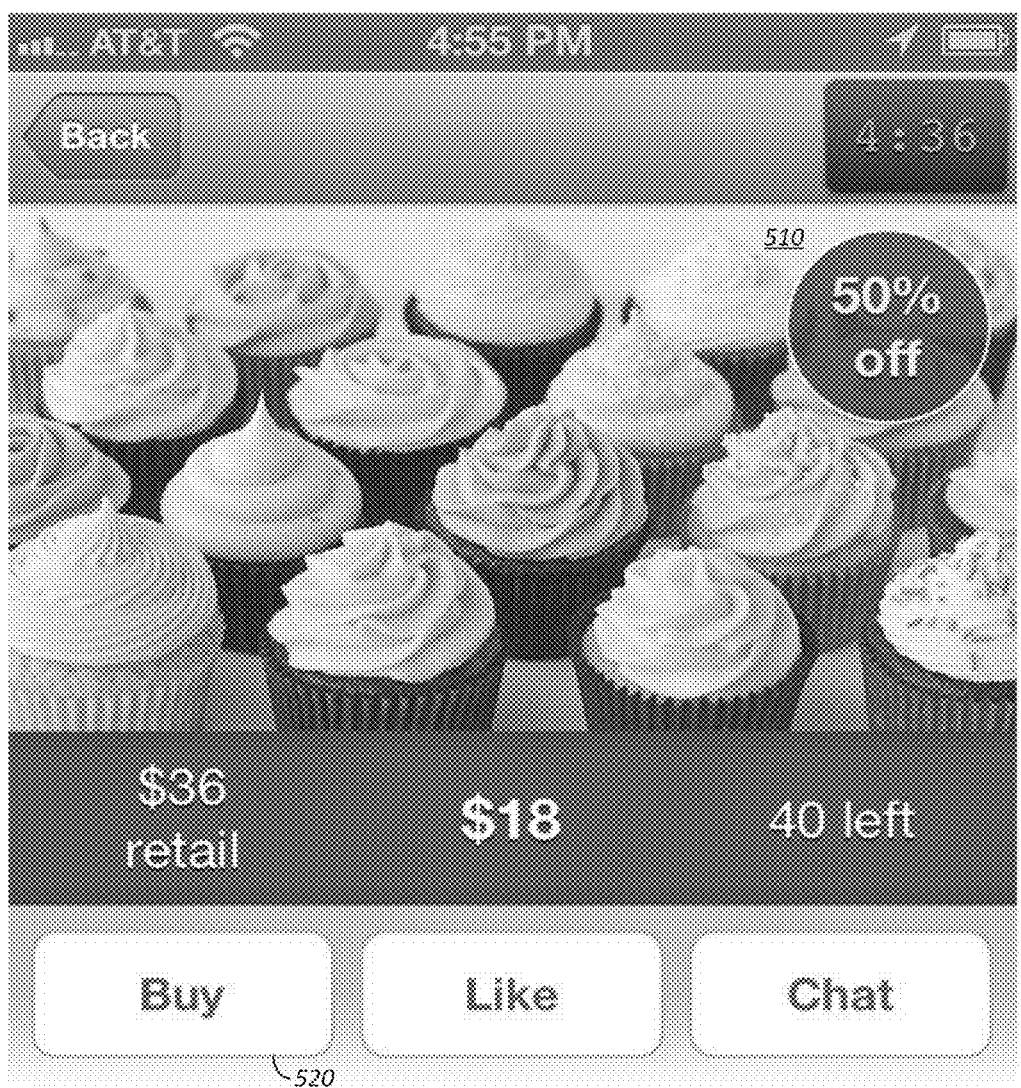
FIGS. 5 and 6 are screen shots illustrating additional information about listed items in time and geolocation listed marketplace according to example embodiments.
Figure 6:
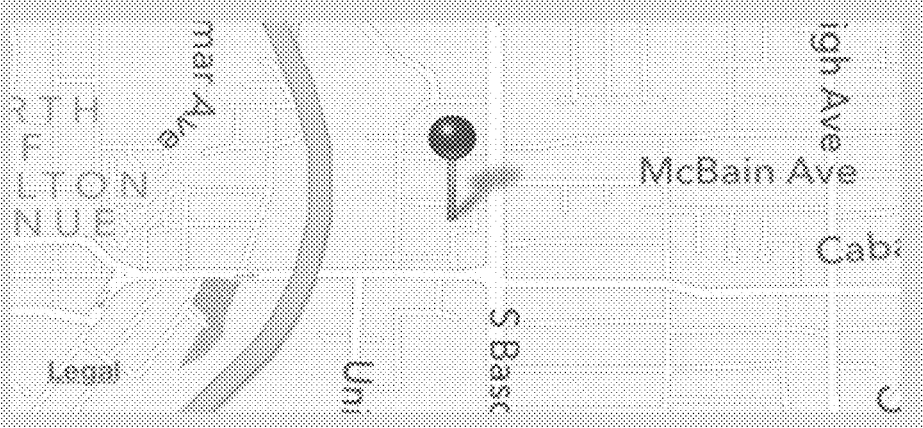
Figure 7:
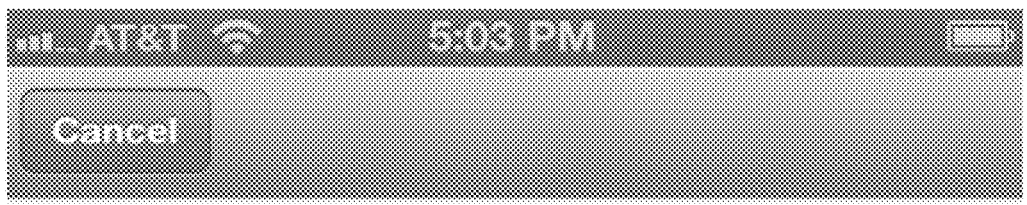
FIG. 7 is a screen shot illustrating a marketkplace in which a prospective buyer may communicate with a seller in near real time according to an example embodiment.
Figure 7:
Figure 8:
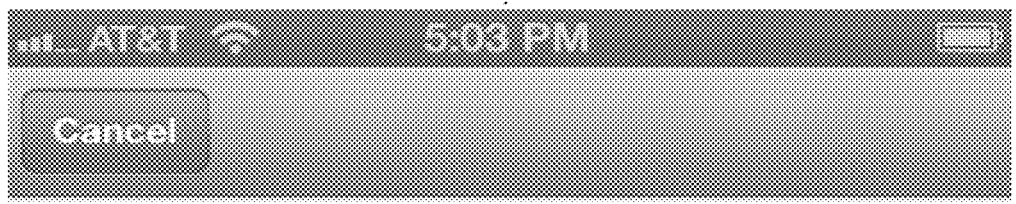
FIG. 8 is a screen shot illustrating a marketplace in which a seller may reply to a prospective buyer's communication in near real time according to an example embodiment.
Figure 8:
Figure 9:
FIG. 9 is a screen shot illustrating a marketplace in which a prospective buyer may respond to a seller's communication in near real time according to an example embodiment.

The items offered for sale on the marketplace may be listed by selectable image/title such as 320, 330 of FIG. 3, or by selectable listing indicated as at a location, 420, on a displayed map 400 of the geographical area of FIG. 4 From these interfaces, the user may access additional information about the item for sale. For example, by clicking on listing 410 of FIG. 4, to obtain information such as the price, discount offered, and the like as at 510 of FIG. 5. Further in FIG. 5, the buyer may purchase an item by selecting buy icon 520. Additionally, clicking on the selectable icon 410 of FIG. 4 may provide the information of FIG. 6 which may indicate the identity of the seller 610, here a dessert and chocolate shop named Sugar Butter Flour; the feedback the publication system has accumulated from this seller account, 620, here 99.9% positive; when the item is available 630; and the address of the seller, 640. In one embodiment the feedback may be pinned to the ecommerce marketplace feedback that the seller has accumulated from the seller's ecommerce marketplace seller account. In another embodiment, there may be a custom feedback accumulator for the app. In some instances, for example as illustrated in FIGS. 7 and 8, the buyer may ask the seller a question about an item offered for sale as at 710 of FIG. 7 by using a text messaging function within the app. The seller may respond within the app using text as at 810 of FIG. 8. Similarly, the potential buyer may respond to the seller as at 910 in FIG. 9. In another embodiment the correspondence may be by email, either within or external to the app.

Figure 10:
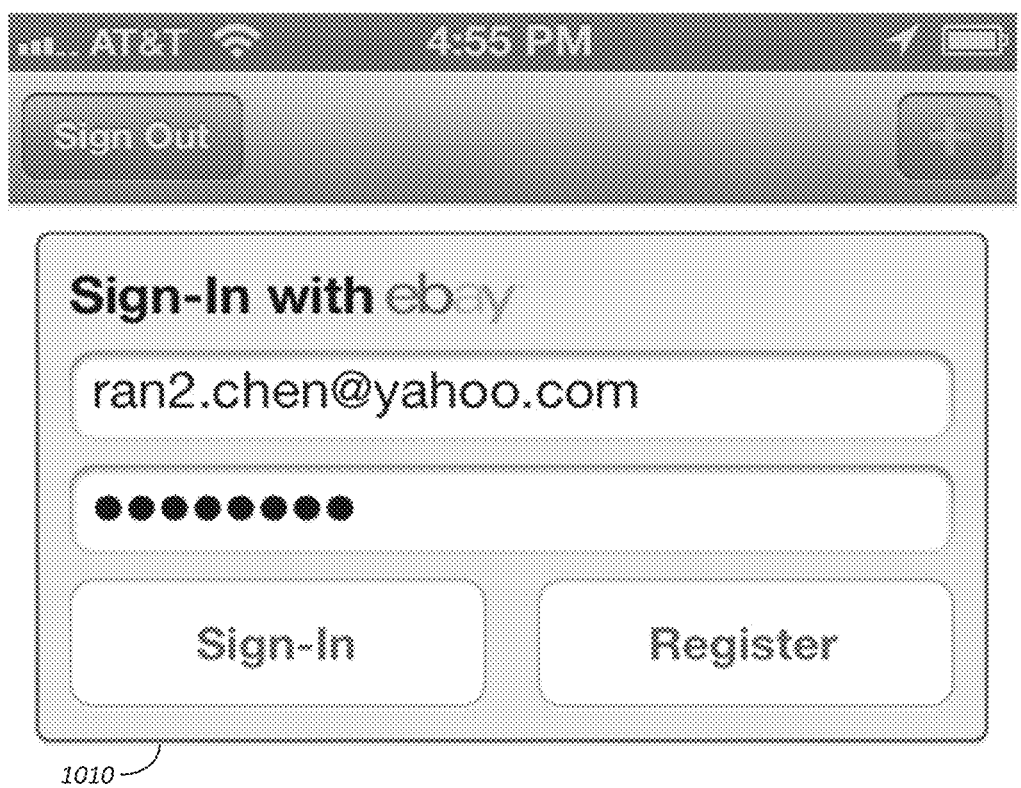
FIG. 10 is a screenshot illustrating a time and geolocation limited marketplace initiating access to another affiliated marketplace for listing items for sale on the time and geolocation limited marketplace, according to an example embodiment.
Figure 10:
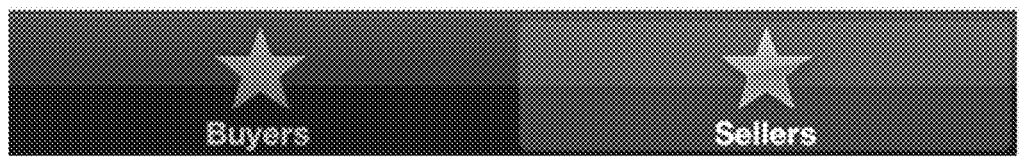

To list items for sale in the time- and geolocation-limited marketplace, the user may access the app by logging in to another affiliated marketplace (e.g., eBay.com) as seen in FIG. 10. In one embodiment sellers may want to use their eBay account to log in and list items for sale. This may allow a number of the listing information fields to be pre-populated with data from the seller's eBay account. In some instances, the user may post items only when the user is within the geographical area during the predefined period of time. :In other instances, the user may post only when within the geographical area but outside of the predefined period of time. For example, a seller located in, and offering goods at Sugar Butter Flour in, Campbell, Calif., would post, or list, items for sale at Sugar Butter Flour, which is at the geolocation indicated in the map of FIG. 4. In other instances, the user may post items for sale regardless of the user's present location and the present time. In some instances, to post an item for sale during the pre-defined period of time, the user may be required to be present in the geographical area. But outside of the pre-defined period of time, the user may post items for sale from other geographic locations. For example, the seller may post items when the seller's device is anywhere and those postings would just be keyed to the seller's home base, which is Sugar Butter Flour in the current example. For example, the seller's account could be registered at the address in Campbell, Calif. for Sugar Butter Flour, and people in Campbell are the ones that will see the seller's postings, regardless of where the seller is located when posting items.

Figure 11:
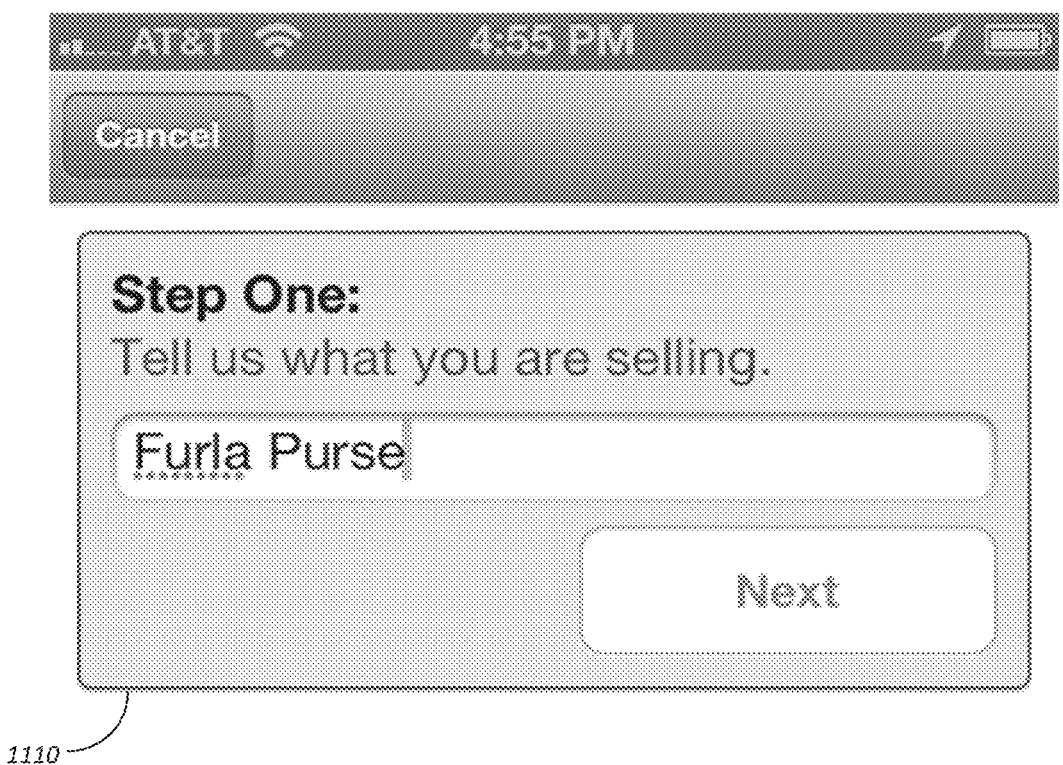
FIG. 11 is a screenshot illustrating a step in a process of listing an item for sale on a time and geolocation limited marketplace, according to an example embodiment.
Figure 11:
Figure 12:
FIG. 12 is a screenshot illustrating an additional step in a process of listing an item for sale on a time and geolocation limited marketplace according to an example embodiment.
Figure 13:
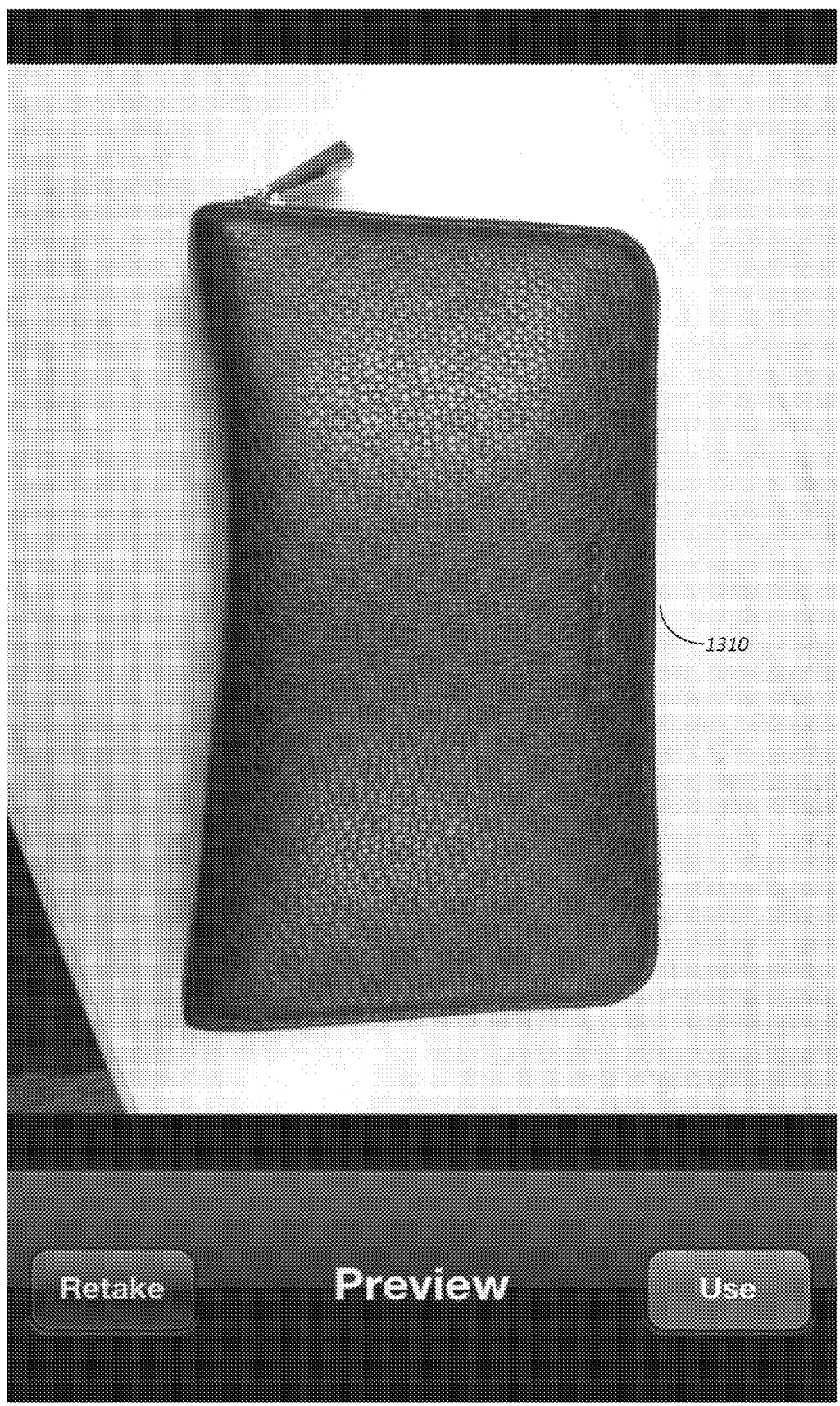
FIGS. 13 and 14 are screen shots illustrating reviewing steps in a process of listing an item for sale on a time and geolocation limited marketplace according to example embodiments.
Figure 14:
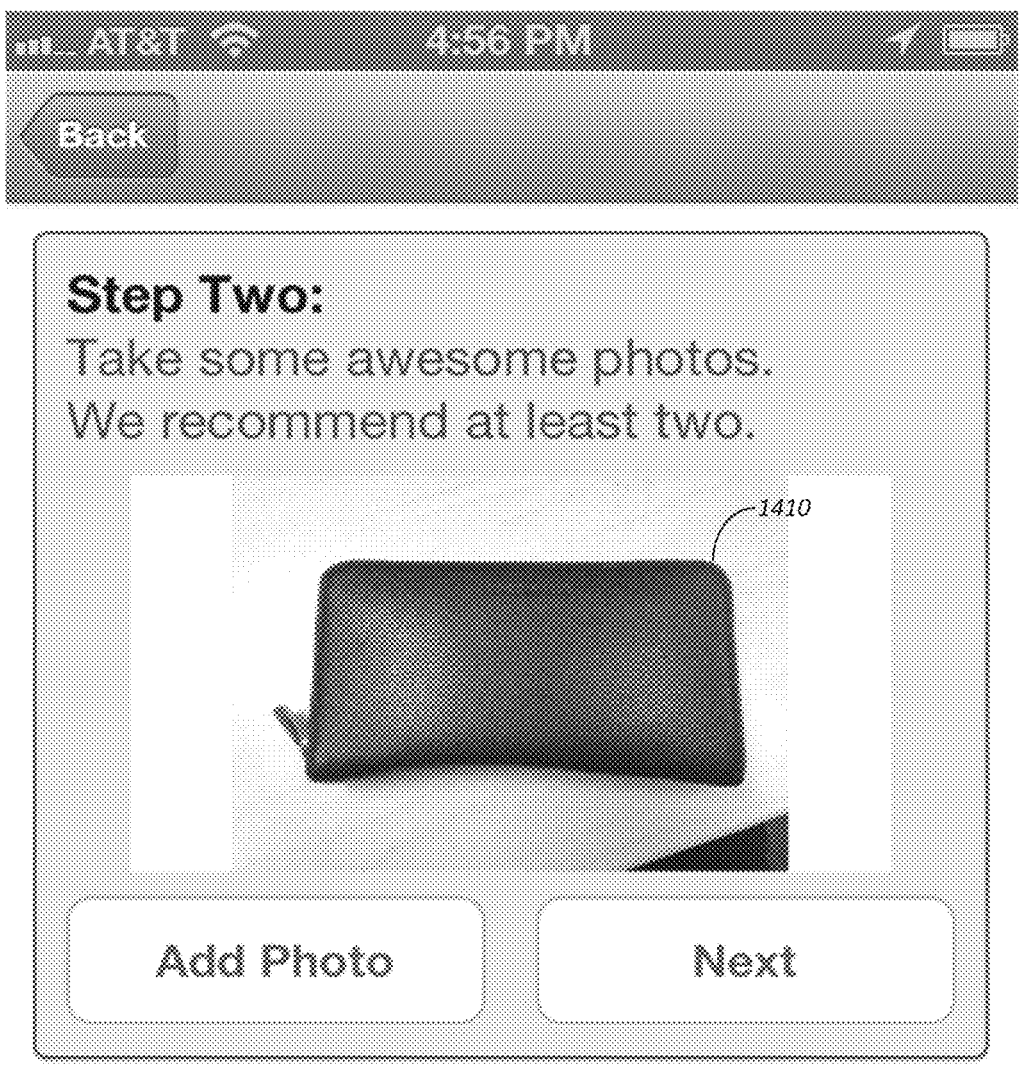
Figure 15:
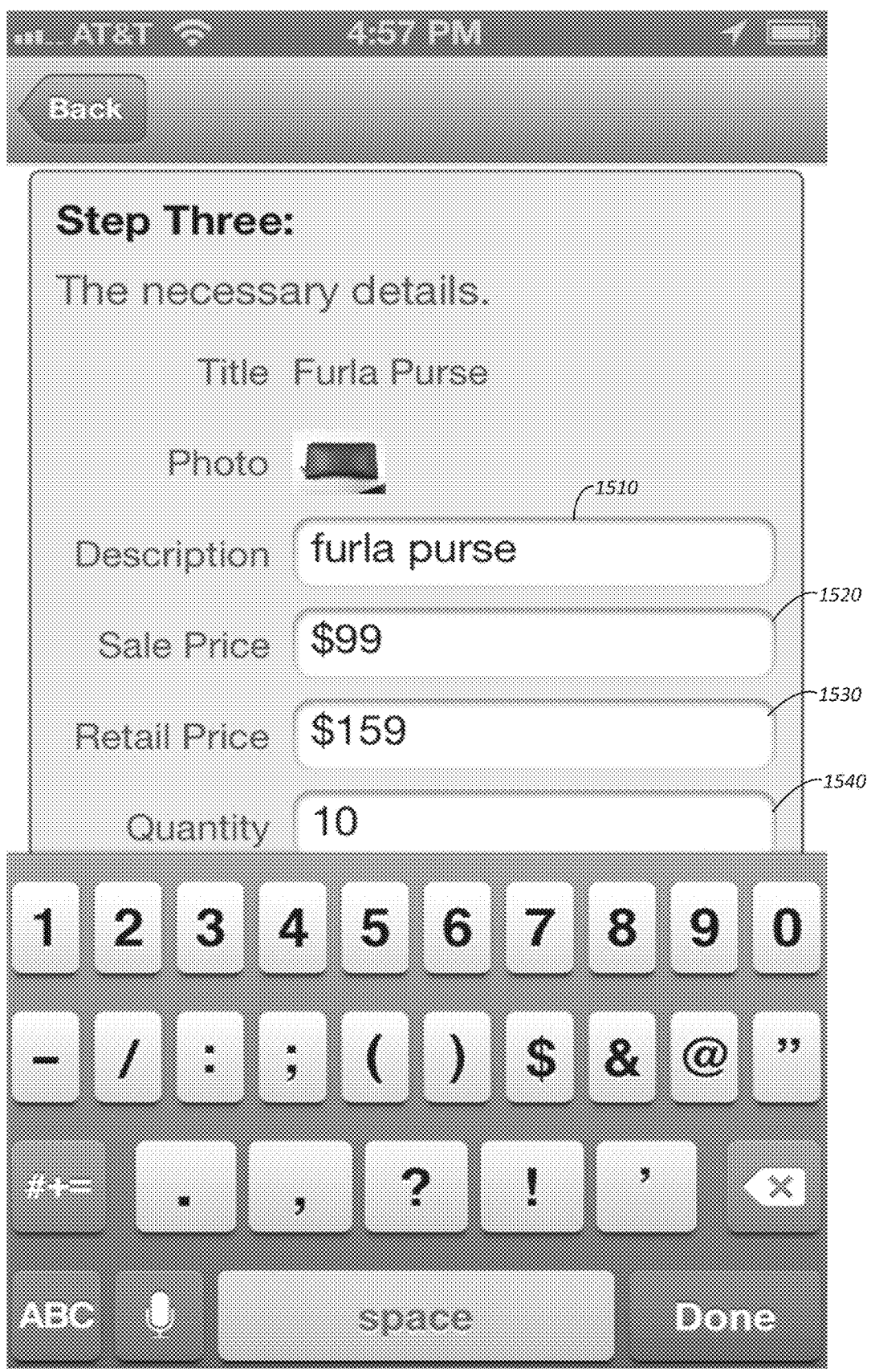
FIG. 15 is a screen shot illustrating steps that may be associated with completing a process of listing an item for sale on a time and geolocation limited marketplace, according to an example embodiment.
Figure 16:
FIG. 16 is screen shot illustrating displaying a listed item to other users on a time and geolocation limited marketplace, according to an example embodiment.
Figure 17:
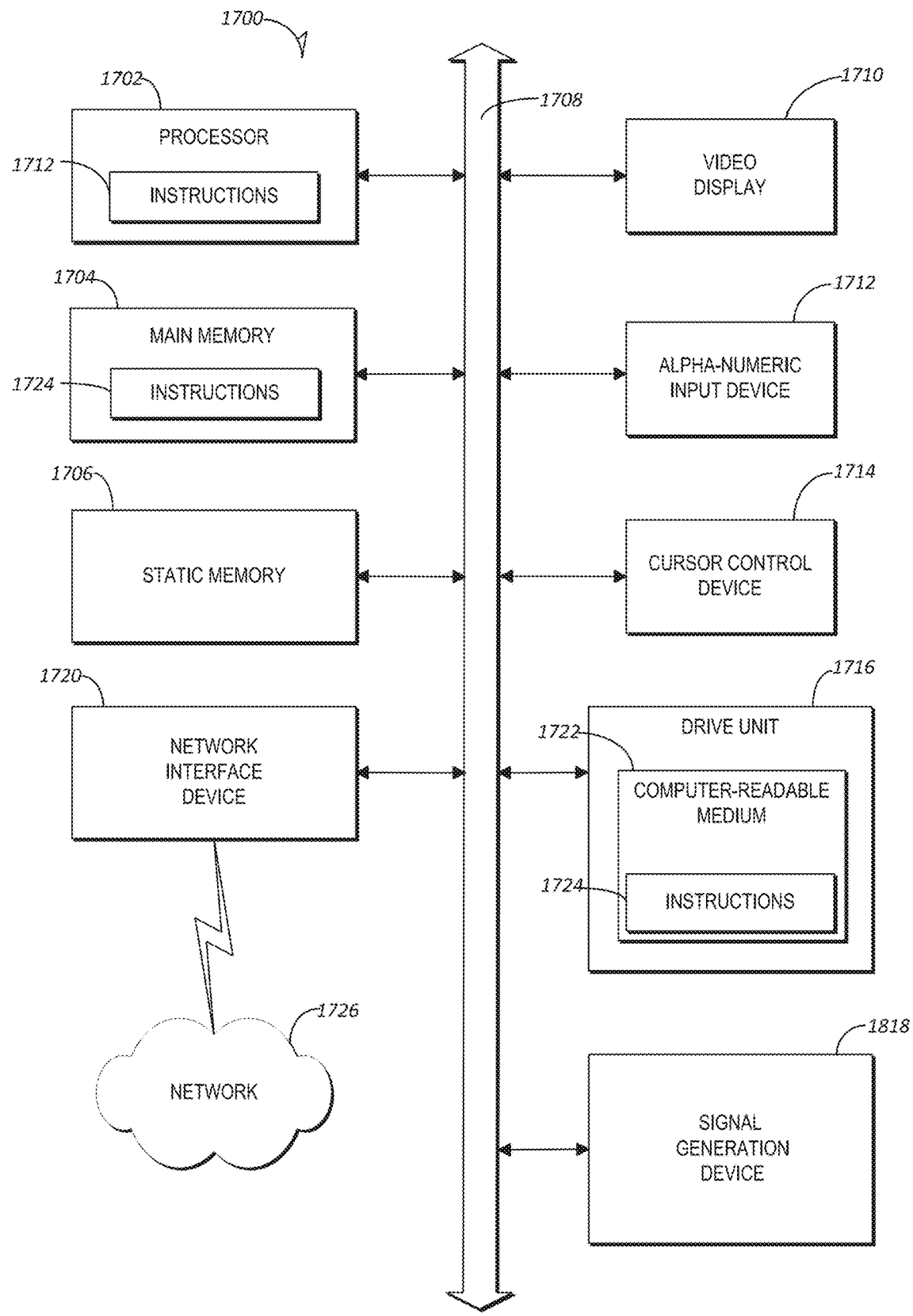
FIG. 17 illustrates a diagrammatic representation of a machine in the example form of a computer system within which a set of instructions may be executed to cause the machine to perform any one or more of the methodologies discussed herein.

A series of user interfaces may be presented to the user via the app to allow the user to provide listing or other information about the items for sale. A user may be prompted to provide a title as at 1110 of FIG. 11, A user may be prompted to provide one or more pictures of the item as at 1210 of FIG. 12. The pictures may be captured using a camera integrated within a mobile device that may be used by the user in this instance of the marketplace. The user may preview the captured image as at 1310 and 1410 of FIGS. 13 and 14, In other instances, the user may select one or more stored images to associate with the listing. The user may provide additional details as in FIG. 15, which may include a text description 1510, sale price 1520, retail price 1539, discount (not shown) and quantity available 1540. The app may then access a profile of the user for information about the user such as name or username, location, payment options, pick-up or delivery options, and the like. The listing, for example 1610, 1620, 1630, may then displayed to other users within the marketplace as at FIG. 16 at the next predefined time in the geographical area. In some instances, the listing may be shown to other users only if the selling user is actually located within the geographical area at the predefined time. The location of the selling user may be determined using GPS, WiFi, or other location-based technology.

In some instances, users may be able to filter items published in the marketplace according to various characteristics. The characteristics may include category, price, delivery or pick-up options, delivery fees, keywords, seller reputation, a discount available, and the like.

Example algorithms that may be used to implement the foregoing may be as follows. The steps need not be undertaken in the numerical order indicated.
1. providing a user interface that displays an item at a geographical location;
2. receiving a signal requesting access to the displayed item;
3. detecting the distance between the source of the signal and the geographical location;
4. determining whether the distance is within a predetermined distance;
5. responsive to determining that the distance is within the predetermined distance, granting access to the item.

Another algorithm that may be used may be as follows.
1. providing a user interface that displays an item at a geographical location;
2. receiving a signal requesting access to the displayed item;
3. detecting the time at which the signal is received;
4. determining whether the time is within a predetermined time period;
5. responsive to determining that the time is within e predetermined time period, granting the requested access.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein, Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

FIG. 2 is a block diagram of machine in the example form of a computer system 200 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 200 includes a processor 202 (e.g., a central processing unit (CPU), a graphics processing unit (GPU) or both), a main memory 204 and a static memory 206, which communicate with each other via a bus 208. The computer system 200 may further include a video display unit 210 (e.g., a liquid crystal display (LCD) or a cathode ray tube (CRT)). The computer system 200 also includes an alphanumeric input device 212 (e.g., a keyboard or a touch-sensitive display screen), a user interface (UI) navigation device 214 (e.g., a mouse), a disk drive unit 216, a signal generation device 218 (e.g., a speaker) and a network interface device 220.

Machine-Readable Medium

The disk drive unit 216 includes a machine-readable medium 222 on which is stored one or more sets of instructions and data structures (e.g., software) 224 embodying or utilized by any one or more of the methodologies or functions described herein. The instructions 224 may also reside, completely or at least partially, within the main memory 204 and/or within the processor 202 during execution thereof by the computer system 200, the main memory 204 and the processor 202 also constituting machine-readable media.

While the machine-readable medium 222 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 224 may further be transmitted or received over a communications network 226 using a transmission medium. The instructions 224 may be transmitted using the network interface device 220 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method for listing a product for sale on an electronic publication system, the method comprising:
    receiving data indicative of a shape corresponding to a geographic area within which a product of products is physically available for sale at a physical store;
    determining that a client machine is located within the geographic area; and
    responsive to determining that the client machine is located within the geographic area:
        providing, to the client machine, a user interface including one or more images of the product available for sale at the physical store;
        receiving, from the client machine, a signal requesting information associated with an item included in the user interface and corresponding to the product; and
        providing the information associated with the item.

2. The method of claim 1, further comprising transmitting an instruction to the client machine to cause display of the item on the client machine after the client machine enters the geographic area.

3. The method of claim 1, wherein the user interface is a first user interface, the method further comprising transmitting an instruction to the client machine to cause display of a second user interface that displays the geographical location of the physical store.

4. The method of claim 1, wherein the user interface is a first user interface, further comprising transmitting an instruction to the client machine to display a second user interface to enable the client machine to send a message to a seller of the product.

5. The method of claim 1, wherein the user interface is a first user interface, the method further comprising transmitting an instruction to the client machine to display a second user interface that displays an additional product available for sale by another store.

6. The method of claim 1, further comprising transmitting an instruction to the client machine to display cost information for the product represented by the one or more images in the user interface.

7. The method of claim 1, wherein the user interface is a first user interface, the method further comprising transmitting an instruction to the client machine to display a second user interface that includes feedback about a seller of the product.

8. A system for listing a product for sale on an electronic publication system, the system comprising:
    a memory; and
    one or more processors, that when executing instructions stored in the memory, perform operations comprising:
        receiving data indicative of a shape corresponding to a geographic area within which a product of products is physically available for sale at a physical store;
        determining that a client machine is located within the geographic area; and
        responsive to determining that the client machine is located within the geographic area:
            providing, to the client machine, a user interface including one or more images of the product available for sale at the physical store;
            receiving, from the client machine, a signal requesting information associated with an item included in the user interface and corresponding to the product; and
            providing the information associated with the item.

9. The system of claim 8, wherein the operations further comprise transmitting an instruction to the client machine to cause display of the item on the client machine after the client machine enters the geographic area.

10. The system of claim 8, wherein the user interface is a first user interface, and wherein the operations further comprise transmitting an instruction to the client machine to cause display of a second user interface that displays the geographical location of the physical store.

11. The system of claim 8, wherein the user interface is a first user interface, and wherein the operations further comprise transmitting an instruction to the client machine to display a second user interface to enable the client machine to send a message to a seller of the product.

12. The system of claim 8, wherein the user interface is a first user interface, and wherein the operations further comprise transmitting an instruction to the client machine to display a second user interface that displays an additional product available for sale by another store.

13. The system of claim 8, wherein the operations further comprise transmitting an instruction to the client machine to display cost information for the product represented by the one or more images in the user interface.

14. The system of claim 8, wherein the user interface is a first user interface, and wherein the operations further comprise transmitting an instruction to the client machine to display a second user interface that includes feedback about a seller of the product.

15. A non-transitory computer readable medium comprising non- transitory computer readable instructions that, when executed by a processor, configure the processor to perform operations for listing a product for sale on an electronic publication system comprising:
  receiving data indicative of a shape corresponding to a geographic area within which a product of products is physically available for sale at a physical store;
  determining that a client machine is located within the geographic area; and
  responsive to determining that the client machine is located within the geographic area:
    providing, to the client machine, a user interface including one or more images of the product available for sale at the physical store;
    receiving, from the client machine, a signal requesting information associated with an item included in the user interface and corresponding to the product; and
    providing the information associated with the item.

16. The non-transitory computer readable medium of claim 15, wherein the operations further comprise transmitting an instruction to the client machine to cause display of the item on the client machine after the client machine enters the geographic area.

17. The non-transitory computer readable medium of claim 15, wherein the user interface is a first user interface, and wherein the operations further comprise transmitting an instruction to the client machine to cause display of a second user interface that displays the geographical location of the physical store.

18. The non-transitory computer readable medium of claim 15, wherein the user interface is a first user interface, and wherein the operations further comprise transmitting an instruction to the client machine to display a second user interface to enable the client machine to send a message to a seller of the product.

19. The non-transitory computer readable medium of claim 15, wherein the user interface is a first user interface, and wherein the operations further comprise transmitting an instruction to the client machine to display a second user interface that displays an additional product available for sale by another store.

20. The non-transitory computer readable medium of claim 15, wherein the operations further comprise transmitting an instruction to the client machine to display cost information for the product represented by the one or more images in the user interface.

* * * * *